United States Patent

Kanno et al.

[11] Patent Number: 5,859,844
[45] Date of Patent: Jan. 12, 1999

[54] UNINTERRUPTED-SERVICE EXPANSION SYSTEM FOR A CROSS CONNECTING DEVICE

[75] Inventors: Keiichi Kanno; Ryuichi Kondo; Koya Sakurai; Toshifumi Fujimoto, all of Sendai, Japan

[73] Assignee: Fujitsu Limited, Kanagawa, Japan

[21] Appl. No.: 703,094

[22] Filed: Aug. 26, 1996

[30] Foreign Application Priority Data

Mar. 22, 1996 [JP] Japan ....................................... 8-65888

[51] Int. Cl.[6] ............................. H04L 12/28; H04Q 11/04
[52] U.S. Cl. .......................... 370/357; 370/386; 370/422
[58] Field of Search ................................... 370/217–220, 370/241, 357, 386, 395, 380, 422, 427

[56] References Cited

U.S. PATENT DOCUMENTS 4,967,405  10/1990  Upp et al. ............................... 370/358
5,282,195  1/1994   Hood et al. ............................. 370/378
5,497,363  3/1996   Gingell ................................... 370/366

Primary Examiner—Melvin Marcelo
Attorney, Agent, or Firm—Helfgott & Karas, P.C.

[57] ABSTRACT

A switching unit of a cross connecting device is expanded with no momentary interruption, while data loss and data overlapping is eliminated. To achieve such an expansion, a cross connecting device comprises a base set having a switching unit for determining an output channel based on virtual path information for cell data that is input and for outputting the cell data. An expanded set has a switching unit for receiving the cell data from the base set and cell data from another base set, and for determining an output channel based on virtual path information for both inputs of cell data and for outputting the cell data. A filter prevents the transmission, to the expanded set, of cell data for which the output channel is determined by the switching unit of the base set.

10 Claims, 13 Drawing Sheets

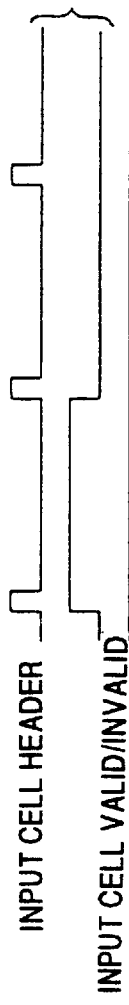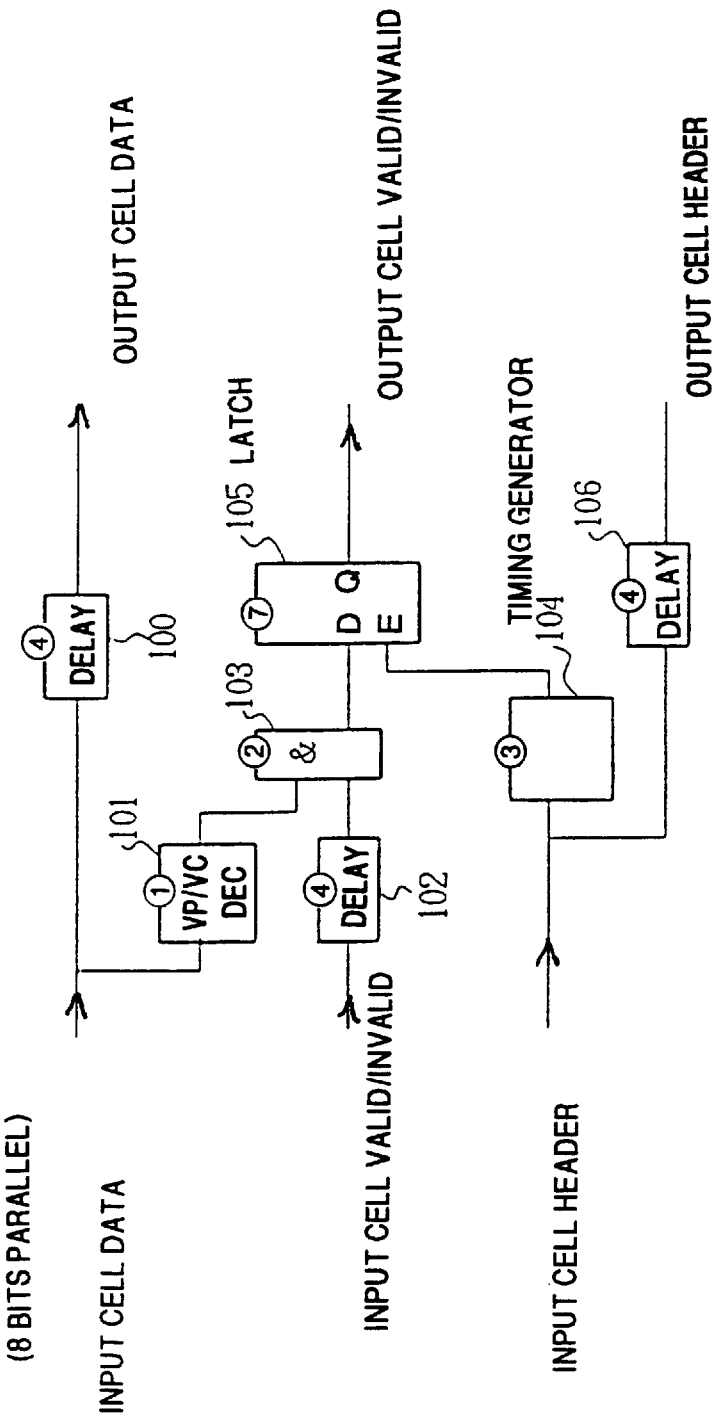

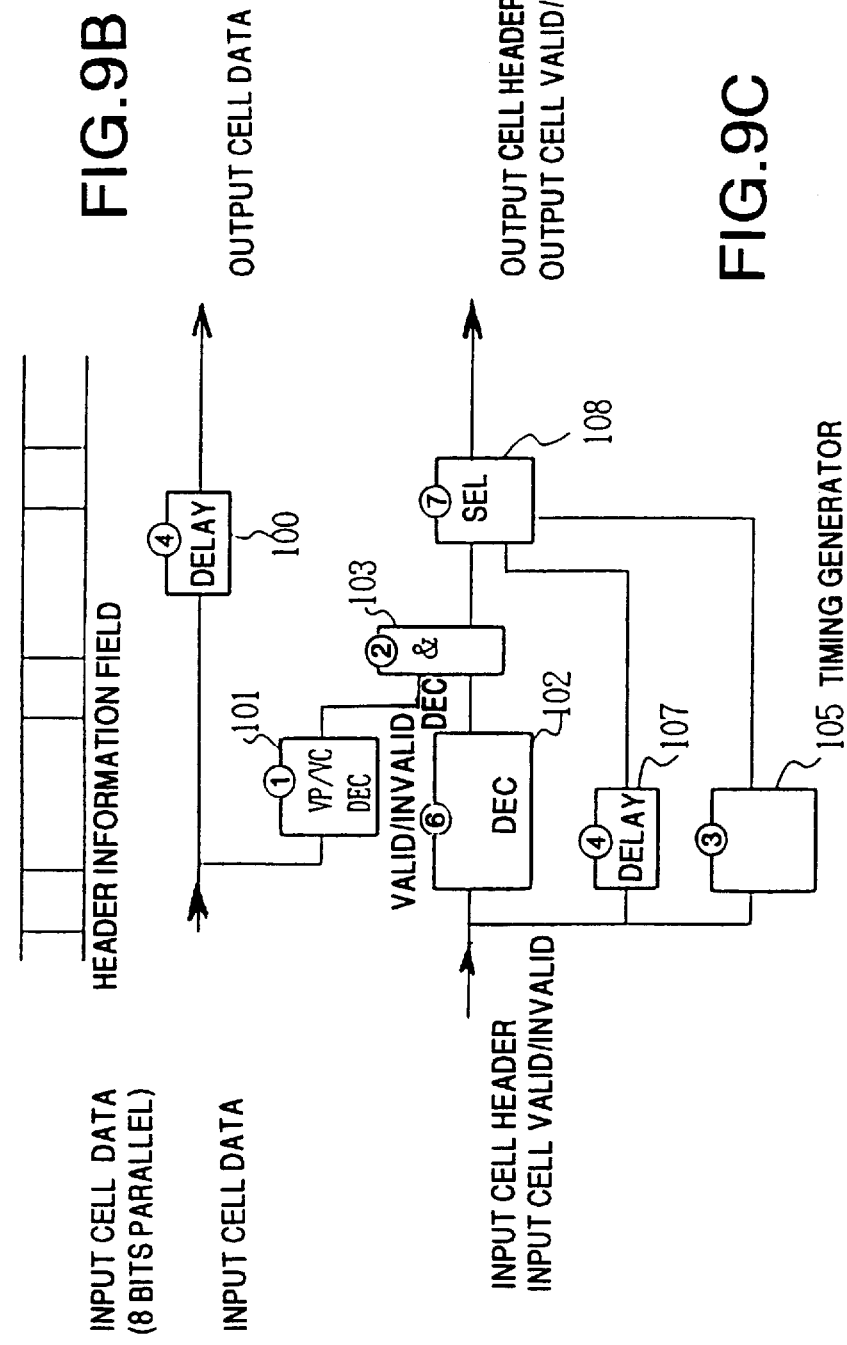

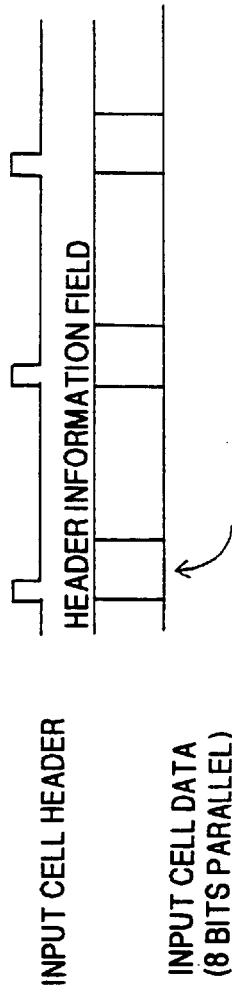
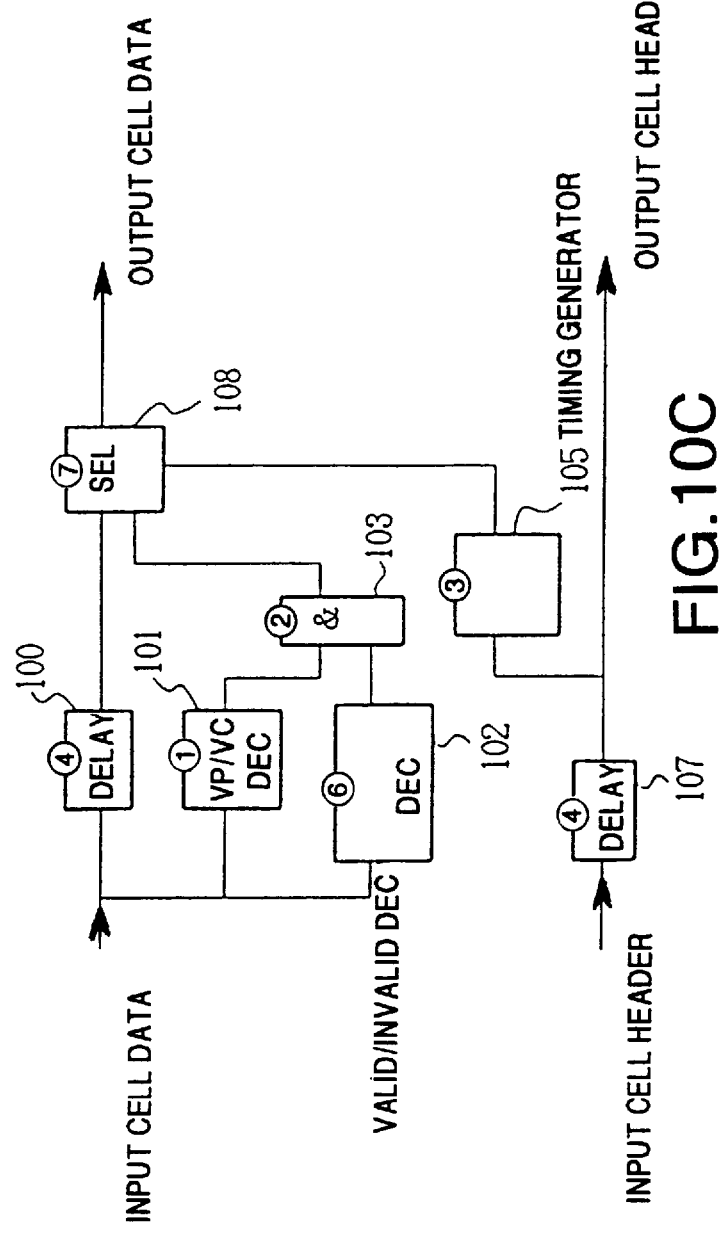

UNINTERRUPTED-SERVICE EXPANSION SYSTEM FOR A CROSS CONNECTING DEVICE

BACKGROUND OF THE INVENTION

The present invention relates to a system by which the channels for a cross connecting device can be extended without momentary interruption.

A cross connecting device assembles the lines of a plurality of subscribers and connects them to a predetermined trunk line by switching their channels. Generally, an 8×8 cross connecting device is provided. In other words, the 8×8 cross connecting device switches eight connect them to eight output input channels so as to connect them to eight output channels.

In order to increase the volume of communications handled and to improve the reliability of a communication function, a cross connecting device is required that can the volume of communications number of input channels to a corresponding switch a greater number of input channels to a corresponding number of output channels.

FIG. 11 is a block diagram illustrating as a base set off an 8×8 cross connecting device, the arrangement of an 8×8 cross connecting device, wherein data are input along eight channels and data are channels. The data that are input and output to eight channels. The data that are input a output are SDH (Synchronous Digital Hierarchy) signals.

SDH signals that are input along the eight channels are transmitted to corresponding interface circuits 10 ... 17. According to a cell format shown in FIG. 12, the received SDH signals are formed into cells, each of which has a header portion and an information field.

Multiplexers 20 ... 27 perform high-speed which are output by the conversion of the cell signals, which are output by the respective interface circuits 10 ... 17, and a of the cells are stacked to form predetermined number of the cells are stacked to form multiplexed cells. Path information is added to the multiplexed cells by VP (virtual path) converters 30 ... 37, and the resultant data are transmitted to a switching unit 4 of the cross connecting device.

The switching unit 4 determines corresponding channels for the multiplexed cells in accordance with the path information, and switches and outputs them. The multiplexed cells from the switching unit 4 are demultiplexed by demultiplexers 40 ... 47, respectively, and the cells are converted into the original SDH signals, which are then transmitted to a trunk line via interface terminals 50 ... 57.

When the switching unit 4 in the 8×8 cross connecting device is to be further extended to increase the number of output channels that correspond to the number of input channels, the 8×8 cross connecting is normally in the operational state.

In FIG. 13 is shown an exemplary arrangement that is 2 assumed when an expanded set 2 for a switching unit is added to the base set 1 of the 8×8 cross connecting device. A switching unit 400 of the expanded set 2 has a 64×64 cross connecting function, and includes eight sets of cross connecting structures, each of which is the same as the switching unit 4 of the base set 1.

With the arrangement in FIG. 13, data are input along 64 input channels, the eight input channels of the base set 1 and 56 input channels of the expanded set 2, are cross-connected by the switching unit 400 of the expanded set 2, and are output to 64 output channels from the expanded set 2.

As is shown in FIG. 13, a communication interruption at the input and output sides of the switching unit 4 of the base set 1 is inevitable when the expanded set 2 is added during operation of the base set 1 so as to replace the switching unit 4 of the base set 1 with the switching unit 400 of the expanded set 2. This interruption occurs during a period extending from the time the switching unit 4 of the base set 1 is disconnected until the expansion using the switching unit 400 of the expanded set 2 is effected. Therefore, transfer paths are severed during this period of time, and data that are to be transmitted are abandoned.

FIG. 14 is a diagram showing another example of an arrangement in which the expanded set 2 for the switching unit is added to the base set 1. Compared with the example shown in FIG. 13, the function of the switching unit 4 of 3 the base set 1 is maintained active, and selectors 60 ... 67 are provided in the base set 1.

According to this arrangement, the same data are input to the switching unit 4 of the base set 1 and the switching unit 400 of the expanded set 2, and the selectors 60 ... 67 switch from the base set side to the expanded set side.

With this structure (FIG. 14) the severing of a transfer path, as described relative to FIG. 13, can be prevented. However, because of a difference in processing delay, a phase difference may occur between the base set 1 data and the expanded set 2 data, both of which are transmitted to the selectors 60 ... 67. Therefore, the data will be abandoned or the data output will be overlapped.

SUMMARY OF THE INVENTION

It is therefore an object of the present invention to provide an uninterrupted-service expansion system for a cross connecting device that resolves the problems that ocscur during the expansion of a switching unit.

To achieve the above object, according to the present invention, a first construction of an uninterrupted-service expansion system for a cross connecting device comprises: a base set having a switching unit for determining a first output channel based on virtual path information for cell data that is input, and for outputting the cell data to the determined first output channel; and an expanded set having a switching unit for receiving the cell data from the base set and cell data from another base set, and for determining a second output channel based on virtual path information for both inputs of cell data and for outputting the cell data to the determined second output channel. Further, a filter is provided for preventing the transmission, to the expanded set, of the cell data for which the first output channel is determined by the switching unit of the base set.

According to a second construction of an uninterrupted-service expansion system for a cross connecting device of the present invention, the filter is provided in the base set of the first construction.

According to a third construction of an uninterrupted-service expansion system for a cross connecting device of tile present invention, the filter is located at an input side of the switching unit in the expanded set in the first construction.

A fourth construction of an uninterrupted-service expansion system for a cross connecting device according to the present invention comprises: a base set having a switching unit for determining a first output channel based on virtual path information for cell data that is input and for outputting the cell data to the determined first output channel; an expanded set having a switching unit for receiving the cell data from the base set and cell data from another base set, and for determining a second output channel based on virtual path information for both inputs of cell data and for outputting the cell data to the same output channel; and a filter for preventing transmission, from the expanded set to the base set, of the data for which the second output channel is determine the switching unit of the expanded set.

According to a fifth construction of an uninterrupted service expansion system of the present invention, filter is provided in the base set of the fourth embodiment.

According to a sixth construction of an uninterrupted service expansion system for a cross connecting device of the present invention, the filter is located at an output side of the switching unit in the expanded set in the fourth construction.

According to a seventh construction of an uninterrupted-service expansion system for a cross connecting device of the present invention, in the first or the fourth construction, the base set further includes a switch for selecting either output from the switching unit of the base set or output from the switching unit of the expanded set.

According to an eighth construction of an uninterrupted-service expansion system for a cross connecting device of the present invention, in the first or the fourth construction, the base set further includes a multiplexing unit of the base set and the output of the switching unit of the expanded set and for outputting the multiplexed outputs.

BRIEF DESCRIPTION OF THE DRAWINGS

FIGS. 8A through 8C are block diagrams and waveforms illustrating a first exemplary construction of a filter according to the above embodiments;

FIGS. 9A through 9C are block diagrams and waveforms illustrating a second exemplary construction of a filter according to the above embodiments;

FIG. 10A through 10C are block diagrams and waveforms illustrating a third example of a filter according to the above embodiments;

DETAILED DESCRIPTION OF PREFERRED EMBODIMENTS

Figure 1:
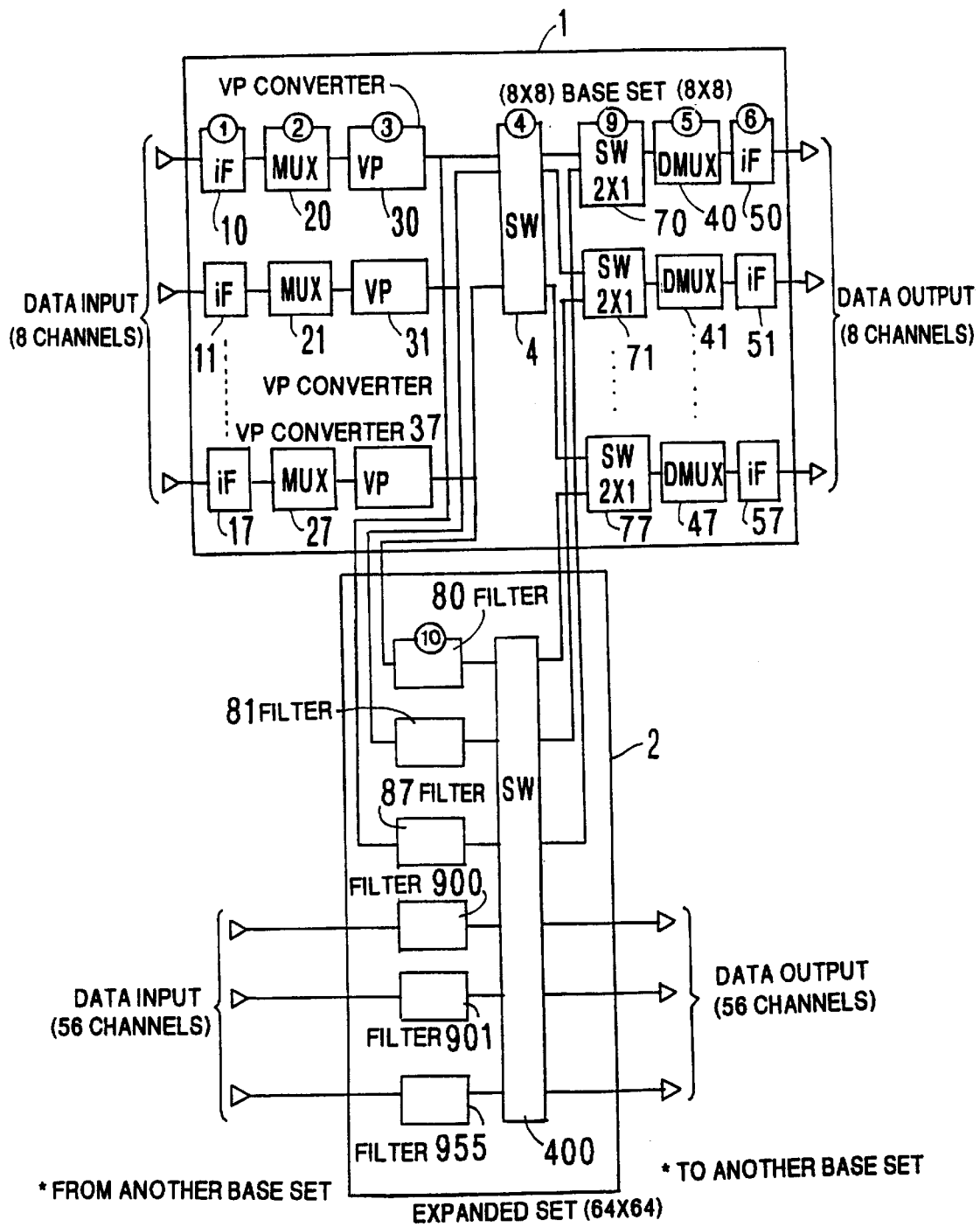
FIG. 1 is a block diagram illustrating a first embodiment of the present invention.

Preferred embodiments will now be described while referring to the accompanying drawings. The same reference numerals are used to denote corresponding or identical components.

Figure 11:
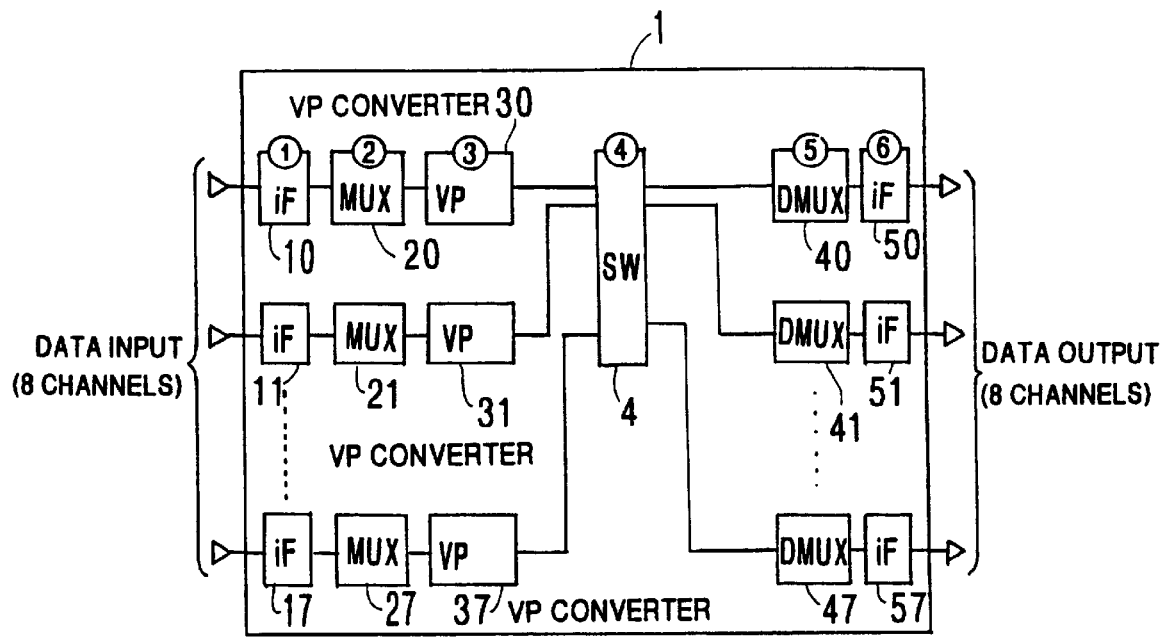
FIG. 11 is a block diagram illustrating the general construction of a cross connecting device.

In FIG. 1 is shown a first embodiment of the present invention. The basic construction of a base set 1 having a switching unit 4 for an 8×8 cross connecting function is the same as that in FIG. 11, and 2×1 switching circuits (SW) 70 . . . 77 are provided.

For extension in the number of channels, an expanded set 2, which has 64 input channels and 64 output channels, is connected to the bass set 1. The expanded set 2 includes a switching unit 400 having a 64×64 cross connecting function. Data on eight input channels out of the 64 are input from the base set 1. The data on the remaining 56 input channels are input from another base set (not shown). The data received along the 64 input channels are respectively transferred to filters 80 . . . 87, and to filters 900 . . . 955, which are connected to the switching unit 400.

The switching unit 4 of the base set 1 processes data only for the eight channels that communicate with the base set 1, and transfers the resultant data to the 2×1 switching circuits 70 . . . 77.

The switching unit 400 of the expanded set 2 processes data received along 64×64 channels, and the filters 80 . . . 87 and 900 . . . 955 in the attached base set filter cells that are transferred to them.

Data input to the 2×1 switching circuits (SW) 70 . . . 77, which are newly provided in the base set 1, do not overlap the output of the switching unit 4 of the base set 1 and the output of the switching unit 400 of the expanded set 2.

As is illustrated in FIG. 1, as the switching unit 4 of the base set 1 is in constant use, regardless of whether or not the expanded set 2 is connected thereto, the abandonment of data, or the overlapping of the output of like data will not occur.

Figure 12:
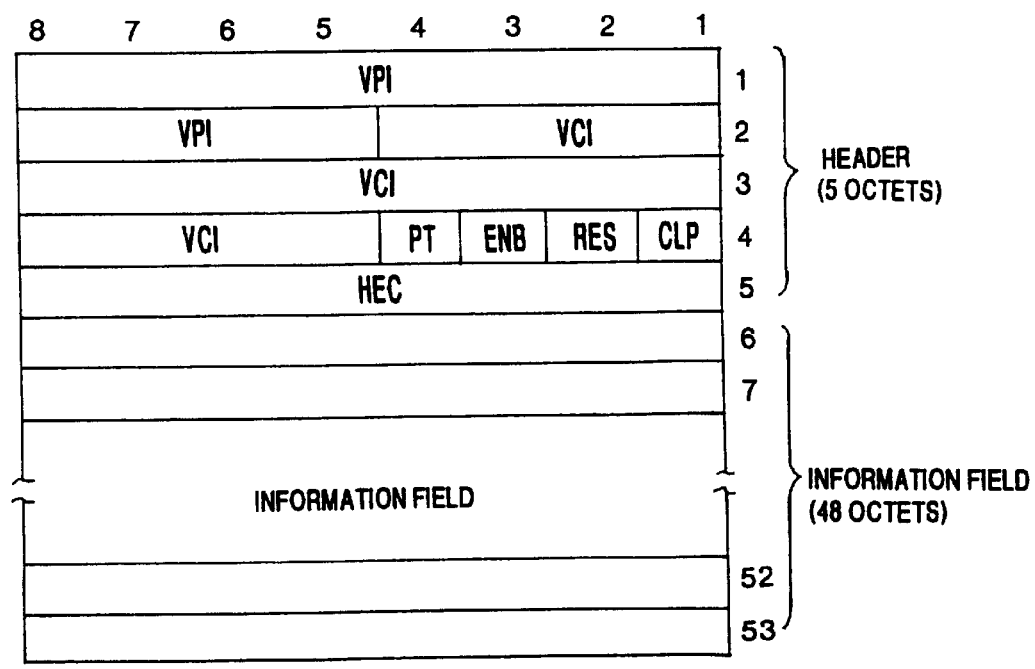
FIG. 12 is a diagram illustrating an example of a cell format.
Figure 13:
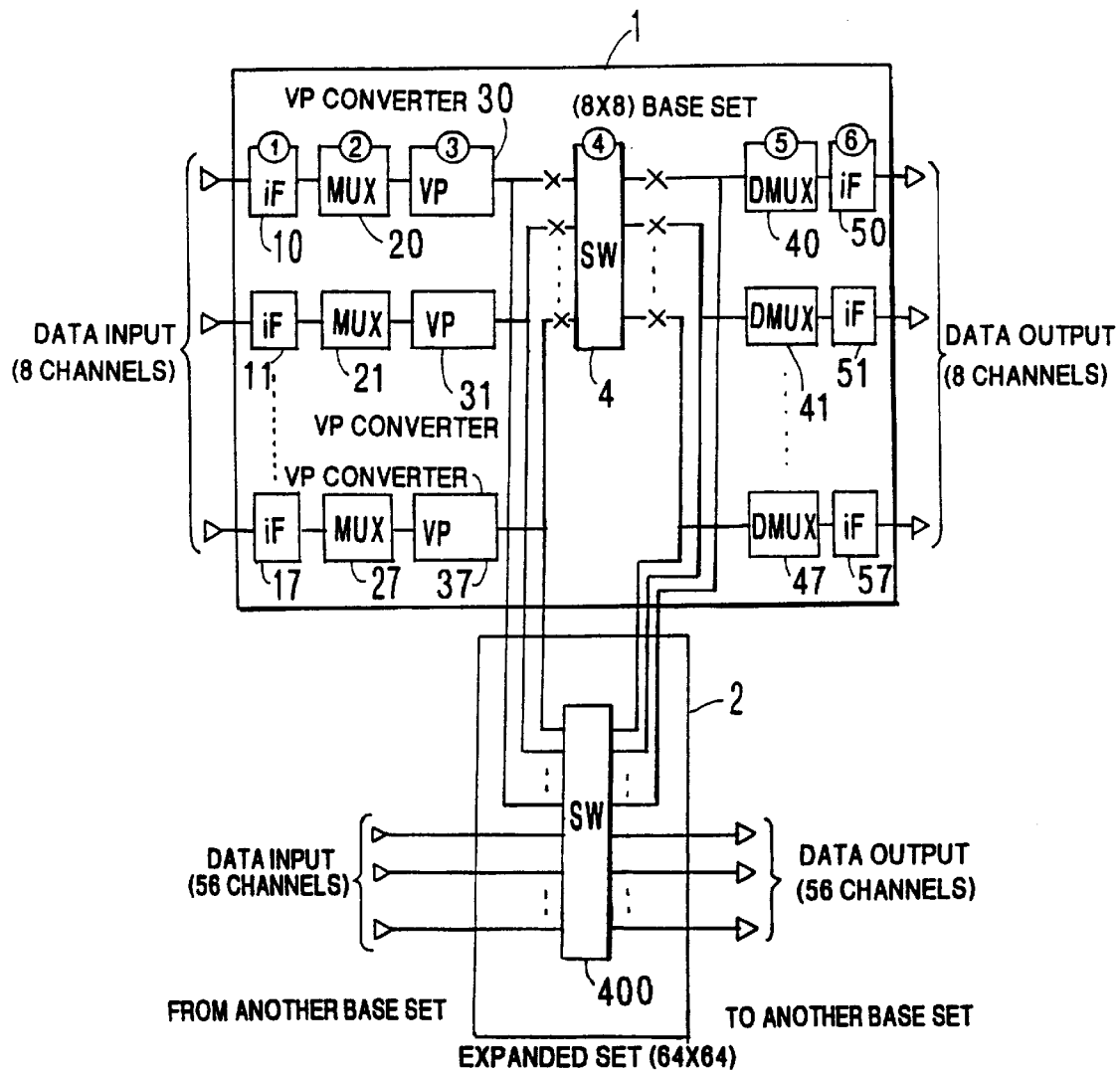
FIG. 13 is a diagram illustrating a first assumed example for the connection of an expanded set.
Figure 14:
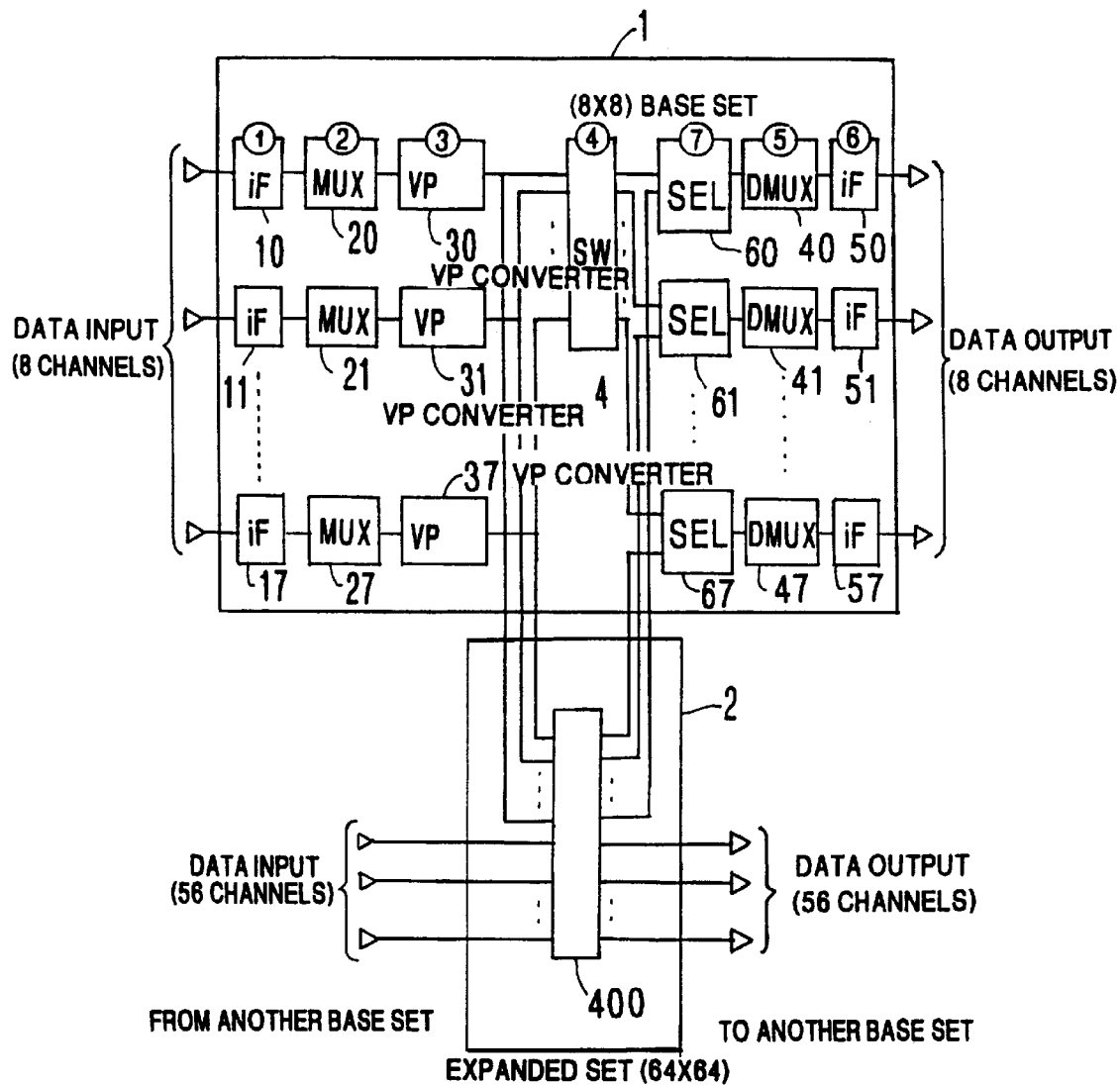
FIG. 14 is a diagram illustrating a second assumed example for the connection of an expanded set.

The functions and operation of the filers 80 . . . 87 and 900 . . . 955 will now be explained. These filters recognize a virtual path identifier (VPI) and virtual channel identifiers (VCI) for the format, which was explained while referring to FIG. 12. To prevent the switching unit 400 from determining channels along which cells should not be passed, pertinent cells are abandoned.

Since this operation is performed in common in the following embodiments, it will be explained again later.

Figure 2:
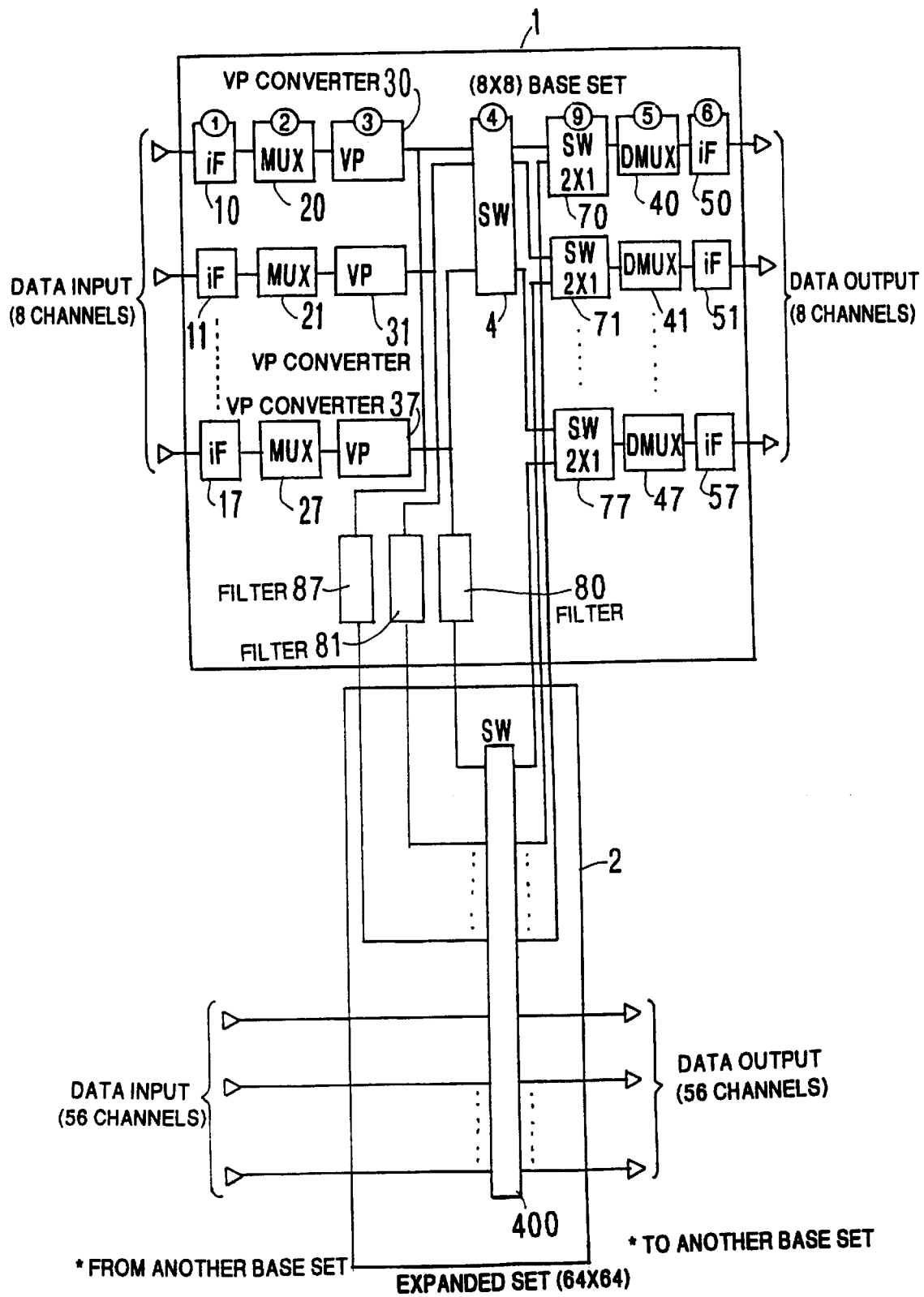
FIG. 2 is a block diagram illustrating a second embodiment of the present invention.

In FIG. 2 is shown a second embodiment of the present invention wherein filters 80 . . . 87 are provided in the base set 1. with this construction, the required number of components for an expanded set 2 can be reduced, and the manufacturing costs can also be reduced. Furthermore, the filters 80 . . . 87 can be controlled directly by the base set 1. The other processing is the same as that for the first construction (FIG. 1).

Figure 3:
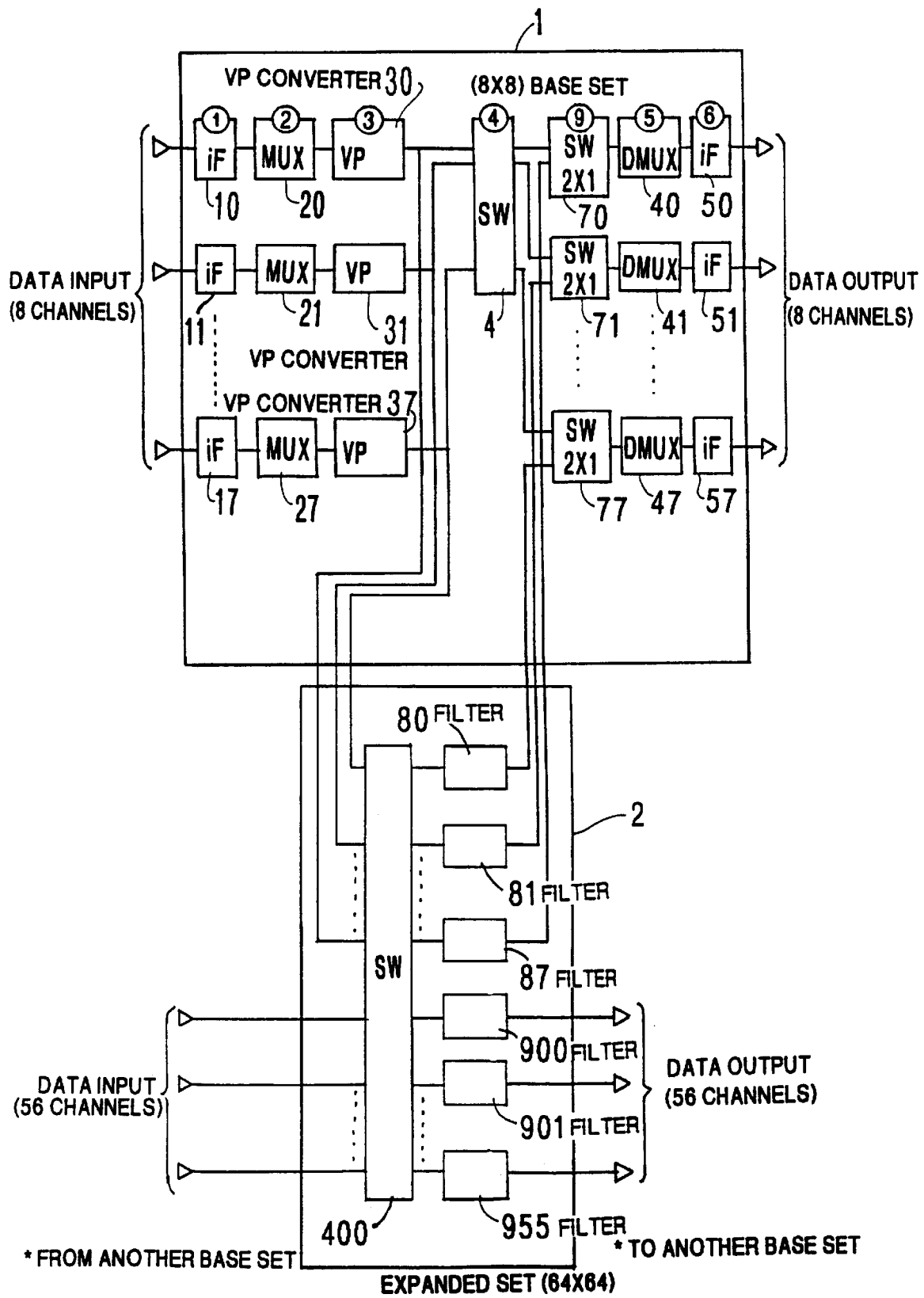
FIG. 3 is a block diagram illustrating a third embodiment of the present invention.

In FIG. 3 is shown a third embodiment of the present invention wherein filters 80 . . . 87 and 900 . . . 955 are provided in an expanded set 2. The feature of this construction is that the filters 80 . . . 87 and 900 . . . 955 are provided on the output side of the switching unit 400 of the expanded set 2 as opposed to the input side in the construction shown in FIG. 1. The processing for this circuitry is basically the same as for that in FIG. 1. With this embodiment, the number of components required for the base set 1 can be reduced, and the manufacturing costs can also be reduced.

Figure 4:
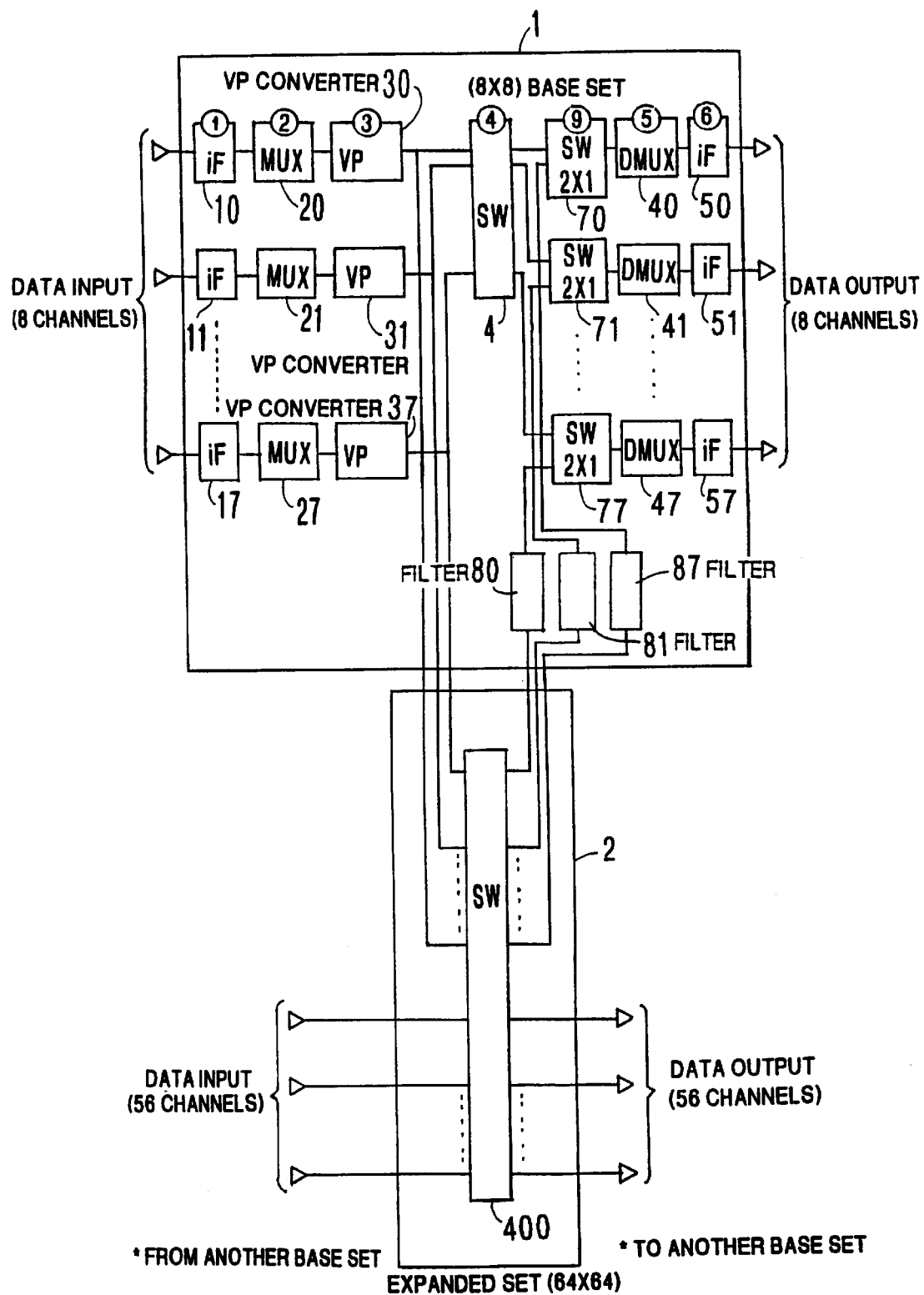
FIG. 4 is a block diagram illustrating a fourth embodiment of the present invention.

In FIG. 4 is shown a fourth embodiment of the present invention. Filters 80 . . . 87 are provided in the base set 1 of the construction which otherwise is the same as shown in FIG. 3. The processing is the same as that for the construction in FIG. 3.

Figure 5:
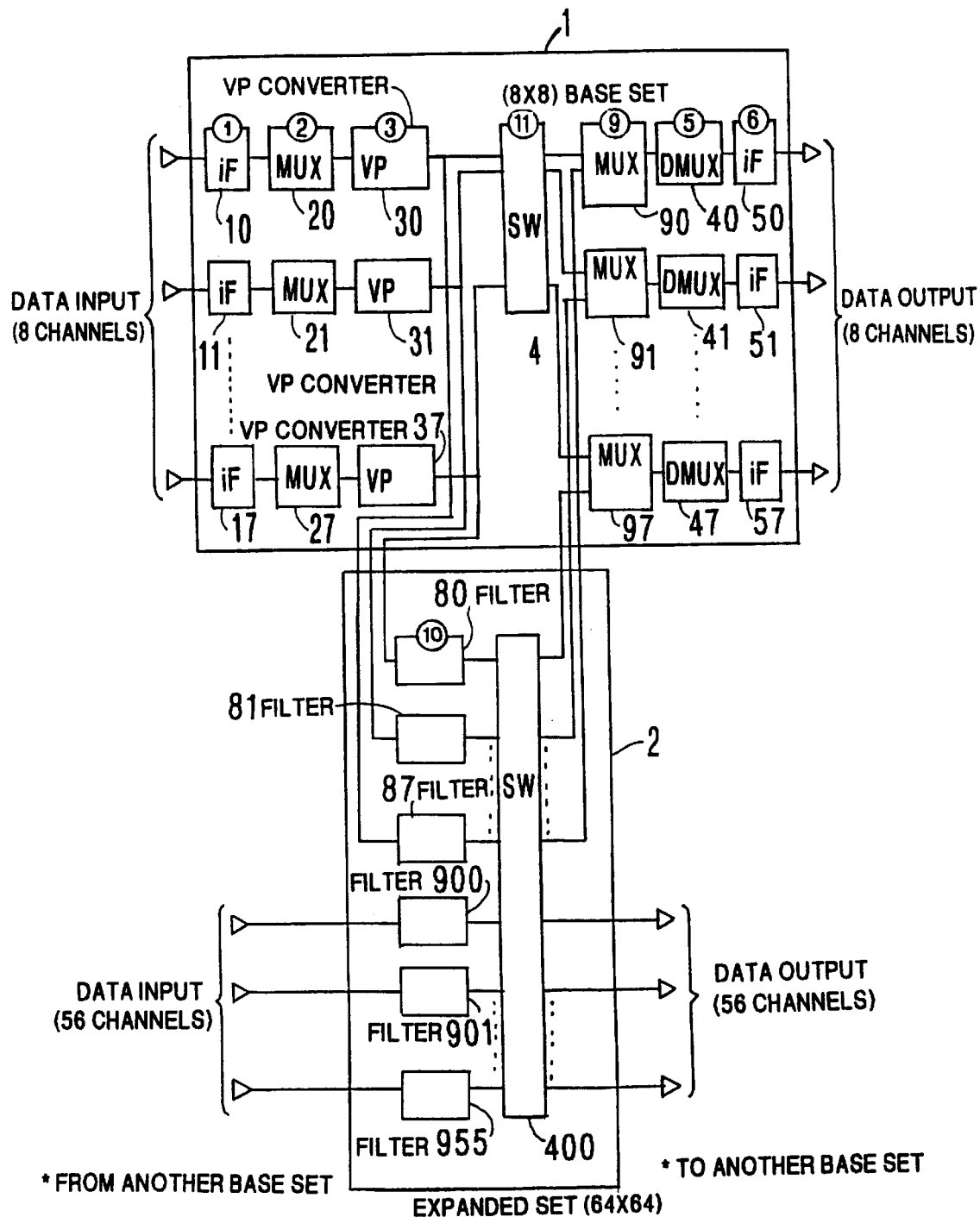
FIG. 5 is a block diagram illustrating a fifth embodiment of the present invention.

In FIG. 5 is shown a fifth embodiment of the present invention, wherein multiplexers 90 . . . 97 are provided in the constructions of the previous embodiments, instead of the 2×1 switching circuits (SW) 70 . . . 77 that are provided on the output side of the switching unit 4 in FIGS. 1–4.

The multiplexers 90 . . . 97 multiplex data received from the base set 1 and data received from the expanded set 2, and thus provide a doubled speed. Furthermore, it is possible to eliminate a data delay process because simultaneous reception is performed; delay occurs when the 2×1 switching circuits 70 . . . 77 are employed.

Figure 6:
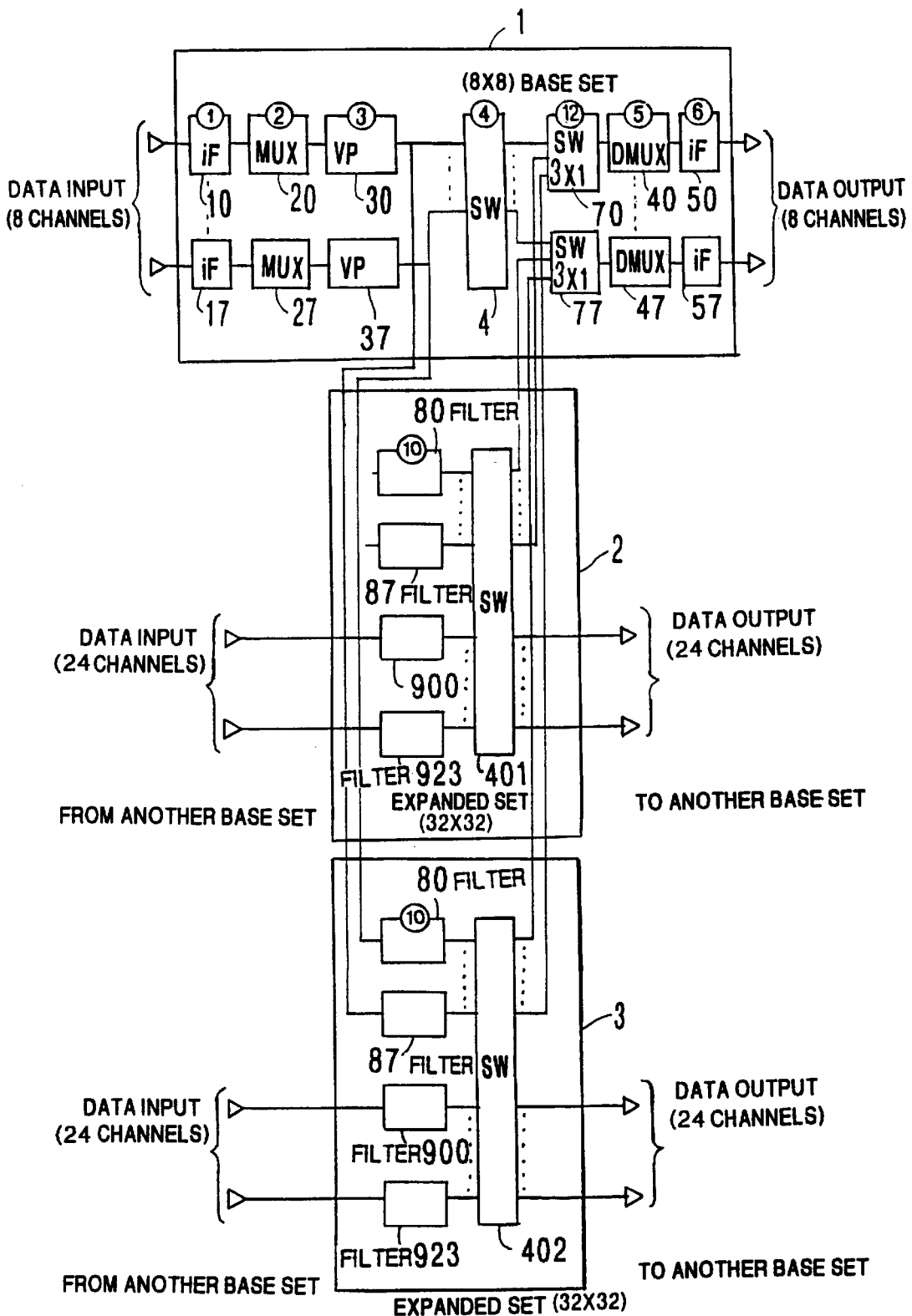
FIG. 6 is a block diagram illustrating a sixth embodiment of the present invention.

In FIG. 6 is shown a sixth embodiment of the present invention, wherein first and second expanded sets having the same construction are employed as expanded sets 2 and 3. Further, switching circuits (SW) 70 . . . 77, which are located on the output side of a switching unit 4 of the base set 1, have a 3×1 function, i.e., from three inputs they produce a single output.

The three inputs are from the switching unit 4 of the base set 1, and from the switching units 401 and 402 of the first and the second expanded sets 2 and 3. The switching units 401 and 402, which have a 32×32 cross connecting function, receives eight sets of data from the base set 1 and 24 sets of data from another base set, and output data for eight channels to the base 1, and data for 24 channels to another base set.

Filters 80 . . . 87 and 900 . . . 923 are the same as those explained with reference to FIG. 1.

According to this construction, the switching circuits (SW) of the base set 1 are not limited to the 3×1 switching circuits (SW) 70 . . . 77, but in general, when N expanded sets are provided, (N+1)×1 switching circuits (SW) can be employed in the base set 1.

Figure 7:
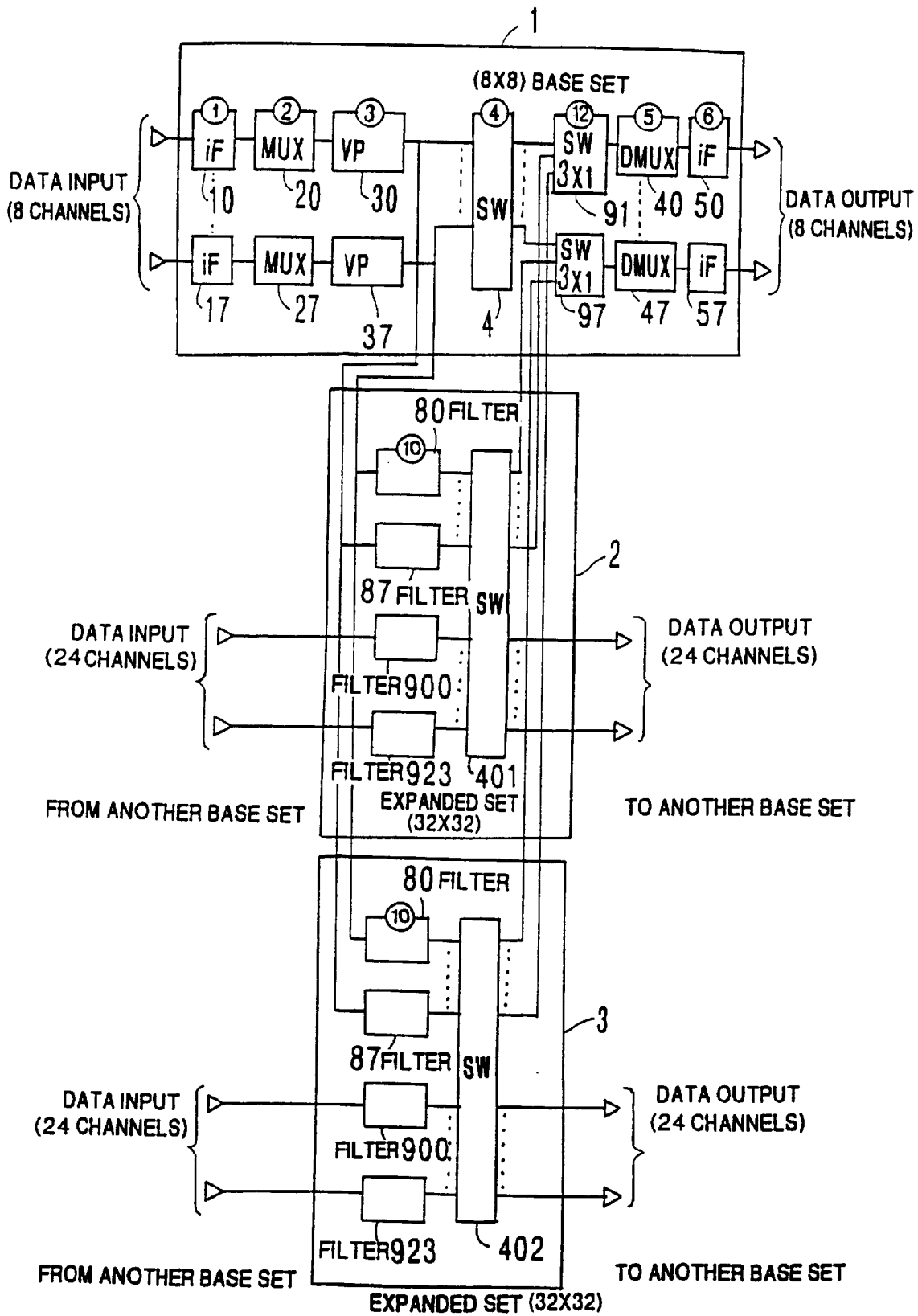
FIG. 7 is a block diagram illustrating a seventh embodiment of the present invention.

In FIG. 7 is shown a seventh embodiment of the present invention, wherein, as in FIG. 6, first and second expanded sets are employed. This embodiment differs from the embodiment shown in FIG. 6 in that multiplexers 91 . . . 97 are provided in the base set 1 instead of the 3×1 switching circuits (SW) 70 . . . 77.

The speed advantage acquired by the employment of the multiplexers 91 . . . 97 is the same as that acquired in the embodiment shown in FIG. 5. In this embodiment in FIG. 7, however, the speed is tripled by the multiplexers 91 . . . 97. In general, when N expanded sets are provided, the multiplexers 91 . . . 97 in the base set 1 perform (N+1)×1 multiplexing.

FIGS. 8A through 8C are diagrams for explaining one exemplary arrangement of a filter that is employed in common in the above embodiments. In order for the filter to determine the channel for a cell, a head signal indicating the head position of a cell, and a valid/invalid signal indicating that the cell is valid or invalid are required.

In FIG. 8A, a head cell and a valid/invalid cell are each transmitted as a single signal in parallel with cell data (see FIG. 8B), and an information field for one cell is transmitted following a header.

FIG. 8C is a diagram illustrating an exemplary construction of a filter for such a transmission system. The filter includes a VPI/VCI decoder 101; delay circuits 100, 106, 102; a logical product operation unit 103; a timing generator 104; and a latch circuit 105.

The VPI/VCI decoder 101 decodes a VPI/VCI, and outputs a logical "H" when a cell is to be abandoned. The input cell that is delayed by the delay circuit 102 in order to match a processing period with a timing in the VPI/VCI decoder 101, and the valid/invalid data for the cell are transmitted to the logical product operation unit 103. The logical product operation unit 103 calculates a logical product of the valid/invalid data and the output of the VPI/VCI decoder 101.

For a cell to be abandoned, validation or invalidation is masked. The timing generator 104 generates a latch timing signal, and the latch circuit 105 latches the valid/invalid data of the cell. In consonance with the timing at which the valid/invalid data of the cell are latched and output, cell data and a cell header are output across the delay circuits 100 and 106.

In FIG. 9A is shown an example wherein a header of a cell and valid/invalid data of the cell are assigned to the same signal. The input of the cell data is synchronized with the timing for the header of the cell and for the valid/invalid data of the cell (see FIG. 9B).

In FIG. 9C is shown an exemplary construction of a filter corresponding to the above condition. The cell valid/invalid decoder 102 extracts the cell valid/invalid data from the cell header and the cell valid/invalid data, which are assigned to the same signal.

The logical product operation unit 103 calculates a logical product of the cell valid/invalid data and a signal output by the VPI/VCI decoder 101, and transmits the logical product to a selector 108. The selector 108 also receives data obtained by the delaying circuit 107 which delays the input cell header and the valid/invalid data.

In addition, the timing generator 105 outputs a selection signal, which is synchronized with the timing at which the valid/invalid decoder 102 outputs cell valid/invalid data, so that with this signal, the selector 108 can be so controlled that it selects the output from the logical product operation unit 103.

FIGS. 10A–C explain the structure of another filter. In this example, a cell header is an independent signal, and cell valid/invalid data are assigned to an enable bit of the header (see ENB at the fourth octet of the header in FIG. 12).

In the examples in FIGS. 8A . . . 8C and 9A . . . 9C, the enable bits ENB of the header are "don't care" bits. In this example of FIGS. 10A–C, however, based on the enable bit END of the header of the cell data, a valid/invalid bit is decoded from the cell data by the valid/invalid decoder 102. Except for this, the example in FIG. 10 is the same as the examples shown in FIGS. 8A . . . 8C and 9A . . . 9C.

As is described above, it is assumed that, when a switching unit is expanded by using the conventional technique, either data loss will be passed over, or data flow will be halted prior to the extension. On the other hand, as is explained for the preferred embodiments of the present invention, a switching unit can be expanded more easily and with no momentary interruption of data flow.

Therefore, an extension system for a cross connecting device can be provided that in the future can easily cope with a variety of networks or communication channels.

The examples depicted in the diagrams are for the described embodiments of the present invention. The present invention, however, is not limited to these embodiments, and is defined by the attached claims. Equivalents of the claims are also within the scope of the present invention.

What is claimed is:

1. An uninterrupted-service expansion system for a cross connecting device, comprising:

a base set having a first switching unit for determining a first output channel based on virtual path information for cell data that is input and for outputting the cell data to the determined first output channel;

an expanded set having a second switching unit for receiving the cell data from the base set and cell data from another base set, and for determining a second output channel based on virtual path information for both inputs of cell data and for outputting the cell data to the determined second output channel; and a filter for preventing transmission to the expanded set of the cell data for which the first output channel is determined by the first switching unit of the base met.

2. The uninterrupted-service expansion system for a cross connecting device according to claim 1, wherein the filter is provided in the base set.

3. The uninterrupted-service expansion system for a cross connecting device according to claim 1, wherein the filter is located in the expanded set at an input side of the second switching unit.

4. An uninterrupted-service expansion system for a cross connecting device, comprising:

a base set having a first switching unit for determining a first output channel based on virtual path information for cell data that is input and for outputting the cell data to the determined first output channel;

an expanded set having a second switching unit for receiving the cell data from the base set and cell data from another base set, and for determining a second output channel based on virtual path information for both inputs of cell data, and for outputting the cell data to the second output channel; and a filter for selectively preventing said second switching unit from outputting the cell data to the second output channel.

5. The uninterrupted-service expansion system for a cross connecting device according to claim 4, wherein the filter is provided in the base set.

6. The uninterrupted-service expansion system for a cross connecting device according to claim 4, wherein the filter is located in the expanded set at an output side of the second switching unit.

7. The uninterrupted-service expansion system for a cross connecting device according to claim 1, wherein the base set further includes a switch for selecting either the output from the first switching unit of the base set or the output from the second switching unit of the expanded set.

8. The uninterrupted-service expansion system for a cross connecting device according to claim 1, wherein the base set further includes a multiplexing unit for multiplexing the output of the first switching unit of the base set and the output of the second switching unit of the expanded set, and for outputting the multiplexed outputs.

9. The uninterrupted-service expansion system for a cross connecting device according to claim 4, wherein the base set further includes a switch for selecting either the output from the first switching unit of the base set or the output from the second switching unit of the expanded set.

10. The uninterrupted-service expansion system for a cross connecting device according to claim 4, wherein the base set further includes a multiplexing unit for multiplexing the output of the first switching unit of the base set and the output of the second switching unit of the expanded set, and for outputting the multiplexed outputs.

* * * * *